(12) United States Patent
Hu et al.

(10) Patent No.: US 10,986,537 B2
(45) Date of Patent: Apr. 20, 2021

(54) METHOD OF SELECTING USER PLANE GATEWAY AND DEVICE OF SELECTING USER PLANE GATEWAY

(71) Applicant: CHINA ACADEMY OF TELECOMMUNICATIONS TECHNOLOGY, Beijing (CN)

(72) Inventors: Weiqi Hu, Beijing (CN); Zhimi Cheng, Beijing (CN); Hui Xu, Beijing (CN)

(73) Assignee: CHINA ACADEMY OF TELECOMMUNICATIONS TECHNOLOGY, Beijing (CN)

(*) Notice: Subject to any disclaimer, the term of this patent is extended or adjusted under 35 U.S.C. 154(b) by 0 days.

(21) Appl. No.: 16/472,325

(22) PCT Filed: Dec. 1, 2017

(86) PCT No.: PCT/CN2017/114248
§ 371 (c)(1),
(2) Date: Jun. 21, 2019

(87) PCT Pub. No.: WO2018/113504
PCT Pub. Date: Jun. 28, 2018

(65) Prior Publication Data
US 2019/0380063 A1 Dec. 12, 2019

(30) Foreign Application Priority Data
Dec. 21, 2016 (CN) .......................... 201611192100.4

(51) Int. Cl.
*H04L 12/24* (2006.01)
*H04W 28/08* (2009.01)
(Continued)

(52) U.S. Cl.
CPC .............. *H04W 28/08* (2013.01); *H04L 67/12* (2013.01); *H04W 88/16* (2013.01)

(58) Field of Classification Search
None
See application file for complete search history.

(56) References Cited

U.S. PATENT DOCUMENTS

2009/0111458 A1* 4/2009 Fox ..................... H04W 84/042
455/422.1
2010/0323700 A1* 12/2010 Bachmann ............ H04W 36/14
455/436
(Continued)

FOREIGN PATENT DOCUMENTS

CN 102340754 A 2/2012
CN 102421071 A 4/2012
(Continued)

OTHER PUBLICATIONS

European Patent Office, Supplementary European Search Report, Communication, PCT/CN2017114248, China Academy of Telecommunications Technology, dated Nov. 11, 2019.
(Continued)

*Primary Examiner* — Brandon M Renner
(74) *Attorney, Agent, or Firm* — Flener IP & Business Law; Zareefa B. Flener

(57) ABSTRACT

A method of selecting a user plane gateway and a device of selecting a user plane gateway are provided. The method includes: receiving, by a CP function, a first data packet sent by a UE; selecting, by the CP function, based on the first data packet, a first target UP-GW for the UE. An UP-GW is selected for the UE when receiving the data packet sent by the UE, so as to enable the data transmission to better adapt to changes of the UP load and the network topology, thereby improving the data transmission efficiency.

19 Claims, 16 Drawing Sheets

(51) Int. Cl.
*H04L 29/08* (2006.01)
*H04W 88/16* (2009.01)

(56) References Cited

U.S. PATENT DOCUMENTS

| | | | |
|---|---|---|---|
| 2012/0243472 A1 | 9/2012 | Bienn et al. | |
| 2014/0198637 A1* | 7/2014 | Shan | H04W 52/244 370/229 |
| 2015/0110095 A1* | 4/2015 | Tan | H04W 12/00 370/338 |
| 2015/0249570 A1* | 9/2015 | Zhang | H04L 43/028 370/254 |
| 2017/0289046 A1* | 10/2017 | Faccin | H04L 47/2433 |
| 2017/0289265 A1* | 10/2017 | Faccin | H04L 65/4007 |
| 2017/0366618 A1* | 12/2017 | Vrzic | H04W 8/18 |
| 2018/0176762 A1* | 6/2018 | Qiao | H04W 76/12 |
| 2018/0332462 A1* | 11/2018 | Kim | H04W 28/02 |
| 2018/0343211 A1* | 11/2018 | Jeong | H04W 88/16 |
| 2019/0075046 A1* | 3/2019 | Yu | H04L 61/1511 |
| 2019/0141524 A1* | 5/2019 | Wang | H04W 12/0401 |

FOREIGN PATENT DOCUMENTS

| | | |
|---|---|---|
| CN | 103517324 A | 1/2014 |
| CN | 103813300 A | 5/2014 |
| WO | 2011134329 A1 | 11/2011 |
| WO | 2014000286 A1 | 1/2014 |

OTHER PUBLICATIONS

SA WG2 Temporary Document, 3GPP TSG SA WG2 Meeting #78, Source: KPN, Title: Key Issue-Offline Small Data Transmission, Document for: Approval, Agenda Item: 9.7, Work Item/Release: NIMTC/3GPP Rel.-10.

Patent Cooperation Treaty, Written Opinion, dated Jul. 4, 2019, PCT/CN2017/114248, China Academy of Telecommunications Technology.

The State Intellectual Property Office of People'S Republic of China, China Academy of Telecommunications Technology, Title of Invention: User Plane Gateway Selection Method and Device, First Office Action, Publication Date: Sep. 2, 2016.

SA WG2 Meeting #116, S2-164206, Jul. 11-15, 2016, Wien, Austria (revision of S2-163610, S2-163937), Source: NEC, Title: Session management with flexible UP GW(s) assignment, Document for: Approval, Agenda Item: 6.10.4, Work Item / Release: FS_NextGen / 14.

SA WG2 Meeting #117, S2-165811, Oct. 17-21, 2016, Kaohsiung City, Taiwan(R.O.C), Source: ZTE Corporation, Title: Relationship Between SSC Mode and SM Models, Document for: Approval, Agenda Item: 6.10.6, Work Item / Release: FS_NEXTGEN / REL14.

SA WG2 Meeting #116BIS, Aug. 29-Sep. 2, 2016, Sanya, P.R. China, Source: LG Electronics, Title: Clarification of UP GW Selection by SM Funciton, Document for: Approval, Agenda Item: 6.10.4, Work Item / Release: FS_NEXT Gen.

* cited by examiner

METHOD OF SELECTING USER PLANE GATEWAY AND DEVICE OF SELECTING USER PLANE GATEWAY

CROSS REFERENCE OF RELATED APPLICATION

The present application is the U.S. national phase of PCT Application PCT/CN2017/114248 filed on Dec. 1, 2017, which claims a priority of Chinese patent application No. 201611192100.4 filed on Dec. 21, 2016, which is incorporated herein by reference in its entirety.

TECHNICAL FIELD

The present disclosure relates to the field of communication technologies, and in particular to a method of selecting a user plane gateway and a device of selecting a user plane gateway.

BACKGROUND

Internet of Things (IoT) users send data infrequently and gustily. In order to implement a high-efficiency data transmission, the 3GPP (3rd Generation Partnership Project) proposes a scheme of transmitting data packets by using the control plane. In this scheme, a data packet sent by a User Equipment (UE) is sent to a selected User Plane-Gateway (UP-GW) through a control plane, and then the UP-GW forwards the data packet sent by the UE to a Data Network (DN).

In the related art, the network selects an UP-GW for the UE when the UE requests an attachment. However, the UP-GW may be changed due to the mobility of the UE and the like. The manner in which the UP-GW is selected for the UE when the UE requests the attachment is likely to cause an imbalance of the User Plane (UP) load, which may easily result in that the UE does not adapt to the network topology, thereby affecting the rate of data transmission.

SUMMARY

An object of the present disclosure is to provide a method and an device of selecting a user plane gateway, so as to solve the following technical issue in the related art: the manner in which the UP-GW is selected for the UE when the UE requests the attachment is likely to cause an imbalance of the User Plane (UP) load, which may easily result in that the UE does not adapt to the network topology, thereby affecting the rate of data transmission.

A method of selecting a user plane gateway is provided in some embodiments of the present disclosure, including:

receiving, by a control plane (CP) function, a first data packet sent by a user equipment (UE);

selecting, by the CP function, based on the first data packet, a first target user plane gateway (UP-GW) for the UE.

Optionally, the method further includes:

sending, by the CP function, the first data packet to the first target UP-GW.

Optionally, subsequent to the selecting, by the CP function, the first target UP-GW for the UE based on the first data packet, the method further includes:

switching on a timer by the CP function based on the first target UP-GW;

receiving, by the CP function, a second data packet sent by the UE;

determining, by the CP function, whether the timer expires;

selecting, by the CP function, a second target UP-GW for the UE in the case that the timer expires; and sending, by the CP function, the second data packet to the second target UP-GW.

Optionally, the method further includes:

sending, by the CP function, the second data packet to the first target UP-GW in the case that the timer does not expire.

Optionally, prior to the receiving, by the CP function, the first data packet sent by the UE, the method further includes:

receiving, by the CP function, an attaching request sent by the UE;

acquiring, by the CP function, based on the attaching request, subscription information of the UE; and determining, by the CP function, based on the subscription information of the UE, whether the UE is an Internet of Things (IoT) user;

in the case that the UE is an IoT user, selecting, by the CP function, no UP-GW for the UE, and sending, by the CP function, an attaching acception message to the UE.

Optionally, the CP function selects the first target UP-GW for the UE based on one or more of:

subscription information of the UE, a location of the UE, a type of the UE, a UP load and a network topology.

Optionally, prior to the receiving, by the CP function, the first data packet sent by the UE, the method further includes:

receiving, by the CP function, a session creation request sent by a mobility management (MM) function, where the session creation request is generated by the MM function based on an attaching request sent by the UE;

creating, by the CP function, based on the session creation request, a connection context of the UE, and allocating an IP address for the UE; and sending to the MM function, by the CP function, a session creation response carrying the IP address.

Optionally, the method further includes:

receiving, by the CP function, a session deletion request sent by the MM function, where the session deletion request is generated by the MM function based on a detaching request sent by the UE;

deleting, by the CP function, the connection context of the UE and the IP address of the UE; and sending, by the CP function, a session deletion response to the MM function.

Optionally, subsequent to the selecting, by the CP function, based on the first data packet, the first target UP-GW for the UE, the method further includes:

selecting, by the CP function, based on the first target UP-GW, a target session management (SM) function for the UE;

sending, by the CP function, a session creation request to the target SM function, where the session creation request is configured to trigger the target SM function to create a connection context of the UE and allocate an IP address for the UE;

receiving, by the CP function, a session creation response sent by the target SM function and carrying the IP address; and sending to the UE, by the CP function, based on the session creation response, an acknowledgement (ACK) message carrying the IP address.

Optionally, the sending, by the CP function, the session creation request to the target SM function includes:

sending, by the CP function, the session creation request and the first data packet to the target SM function.

Optionally, the method further includes:

receiving, by the CP function, a detaching request sent by the UE;

sending, by the CP function, a detaching acception message to the UE, and deleting a signaling connection with the UE.

Optionally, the CP function is an SM function.

Optionally, the CP function is an MM function.

A device of selecting a user plane gateway is further provided in some embodiments of the present disclosure, including:

a first receiving module, configured to receive a first data packet sent by a user equipment (UE);

a first selecting module, configured to select, based on the first data packet, a first target user plane gateway (UP-GW) for the UE.

Optionally, the device further includes:

a first sending module, configured to send the first data packet to the first target UP-GW.

Optionally, the device further includes:

a switching-on module, configured to switch on a timer based on the first target UP-GW;

a second receiving module, configured to receive a second data packet sent by the UE;

a first determining module, configured to determine whether the timer expires;

a second selecting module, configured to select a second target UP-GW for the UE in the case that the timer expires; and a second sending module, configured to send the second data packet to the second target UP-GW.

Optionally, the device further includes:

a third sending module, configured to send the second data packet to the first target UP-GW in the case that the timer does not expire.

Optionally, the device further includes:

a third receiving module, configured to receive an attaching request sent by the UE;

an acquiring module, configured to acquire, based on the attaching request, subscription information of the UE;

a second determining module, configured to determine based on the subscription information of the UE, whether the UE is an Internet of Things (IoT) user; and a fourth sending module, configured to, in the case that the UE is an IoT user, select no UP-GW for the UE and send an attaching acception message to the UE.

Optionally, the first selecting module is configured to select the first target UP-GW for the UE based on one or more of:

subscription information of the UE, a location of the UE, a type of the UE, a UP load and a network topology.

Optionally, the device further includes:

a fourth receiving module, configured to receive a session creation request sent by a mobility management (MM) function, where the session creation request is generated by the MM function based on an attaching request sent by the UE;

a creation module, configured to create, based on the session creation request, a connection context of the UE, and allocate an IP address for the UE; and a fifth sending module, configured to send to the MM function a session creation response carrying the IP address.

Optionally, the device further includes:

a fifth receiving module, configured to receive a session deletion request sent by the MM function, where the session deletion request is generated by the MM function based on a detaching request sent by the UE;

a deleting module, configured to delete the connection context of the UE and the IP address of the UE; and a sixth sending module, configured to send a session deletion response to the MM function.

Optionally, the device further includes:

a third selecting module, configured to select, based on the first target UP-GW, a target session management (SM) function for the UE;

a seventh sending module, configured to send a session creation request to the target SM function, where the session creation request is configured to trigger the target SM function to create a connection context of the UE and allocate an IP address for the UE;

a sixth receiving module, configured to receive a session creation response sent by the target SM function and carrying the IP address; and an eighth sending module, configured to send to the UE, based on the session creation response, an acknowledgement (ACK) message carrying the IP address.

Optionally, the seventh sending module is configured to send the session creation request and the first data packet to the target SM function.

Optionally, the device further includes:

a seventh receiving module, configured to receive a detaching request sent by the UE;

a ninth sending module, configured to send a detaching acception message to the UE, and delete a signaling connection with the UE.

Optionally, the user plane gateway selection device is an SM function entity.

Optionally, the user plane gateway selection device is an MM function entity.

A device of selecting a user plane gateway is further provided in some embodiments of the present disclosure, including a processor, a transceiver and a memory, where the processor is configured to read a program in the memory to:

receive a first data packet sent by a user equipment (UE);

select, based on the first data packet, a first target user plane gateway (UP-GW) for the UE;

the transceiver is configured to receive and send data; and the memory is configured to store data used by the processor when performing an operation.

The above embodiments of the present disclosure have at least the following beneficial effects:

According to the embodiments of the present disclosure, the CP function receives the first data packet sent by the UE, and the CP function selects the first target UP-GW for the UE based on the first data packet. In this way, according to the method of selecting a user plane gateway of the present disclosure, an UP-GW is selected for the UE when receiving the data packet sent by the UE, so as to enable the data transmission to better adapt to changes of the UP load and the network topology, thereby improving the data transmission efficiency.

BRIEF DESCRIPTION OF THE DRAWINGS

In order to more clearly illustrate the technical solutions of the embodiments of the present disclosure, the drawings used in the description of the embodiments of the present disclosure will be briefly described. It is obvious that the drawings in the following description are only some embodiments of the present disclosure. Other drawings may also be obtained from those of ordinary skill in the art based on these drawings.

DETAILED DESCRIPTION

Figure 1:
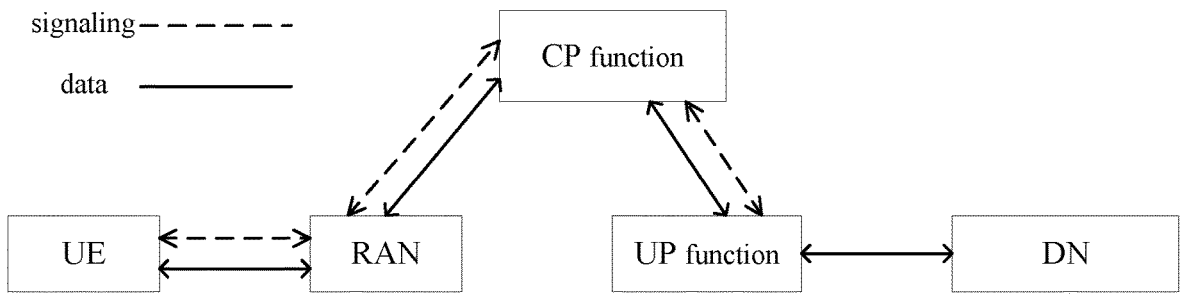
FIG. 1 is a schematic view of an architecture of transmitting infrequent small data through a control plane in some embodiments of the present disclosure.

In order to make the technical issues, the technical solutions and the advantages of the present disclosure more clear, the present disclosure will be described hereinafter in conjunction with the drawings and embodiments.

Separation of control and forwarding means that the control and forwarding functions of the mobile network are logically divided, and different logical network elements are responsible for the corresponding functions, thereby realizing a centralized function control, a resource elastic deployment, a flexible service deployment, and separate evolutions of control planes and user planes. The control function is undertaken by a centralized controller to implement functions such as policy control, traffic scheduling, connection management, and mobility management. A variety of applications can define network routing and transport rule policies based on business characteristics without relying on the resources, performance and other constraints of the underlying forwarding device, thereby shielding the difference from underlying network devices, being more flexible, intelligent and adaptable. The user plane after the separation can be distributed and deployed according to the service requirements, and various processing and forwarding operations of routing, modifying, statistics for the user packets are efficiently performed based on the instructions of the control plane, thereby being simple, efficient and stable.

In the related art, introducing new features in a network usually requires defining a new functional entity and defining an interface between the new functional entity and the functional entity in the related art. With the continuous introduction of new features, the number of functional entities and interfaces in the operator network is increasing. By analyzing the functions of the network elements in the related art, it is found that the functions of these network elements are often overlapped (for example, IP packet processing, load balancing), and similar or similar functions exist in the business process. In order to reduce the number of network elements and interfaces in the operator network and make the network more concise and efficient, the control plane function reconstruction technology splits the control logic of the network in the related art into independent functional modules, and then combines according to different application scenarios to form different network control surfaces.

In the Evolved Packet System (EPS), the Mobility Management Entity (MME) supports both Mobility Management (MM) and Session Management (SM) functions at the same time. The MM function is, for example, an attachment, tracking area update, etc., the SM is, for example, the establishment, modification and deletion of a public data network connection. Both the MM message and the SM message sent by the UE are terminated at the MME and processed by the MME.

In order to improve the modularity of the network, in the next generation (for example, 5G) network, MM and SM may exist as two independent functional modules. The main functions of the MM include a user registration, UE unreachable discovery, a location registration, a UE state transition, a mobility of active state and inactive state, a UE mobility restriction, a UE mobility management control and a gateway selection, a creation of a user plane path, and so on. The main functions of SM includes a data packet forwarding and detection, a session control, a user plane function selection, a UE IP address allocation (connection type is IP). When the UE accesses the network through the radio, the UE firstly connects to the MM, and the MM is responsible for receiving the MM message and the SM message. The MM selects an SM connection for the UE.

According to the flow of 3GPP TR 23.799, an architecture of transmitting infrequent small data through a control plane is shown in FIG. 1. The UE transmits data to a Radio Access Network (RAN), and the RAN transmits data to a CP function. The CP function sends data to the UP function, and then the UP function transmits the output to a DN.

Figure 2:
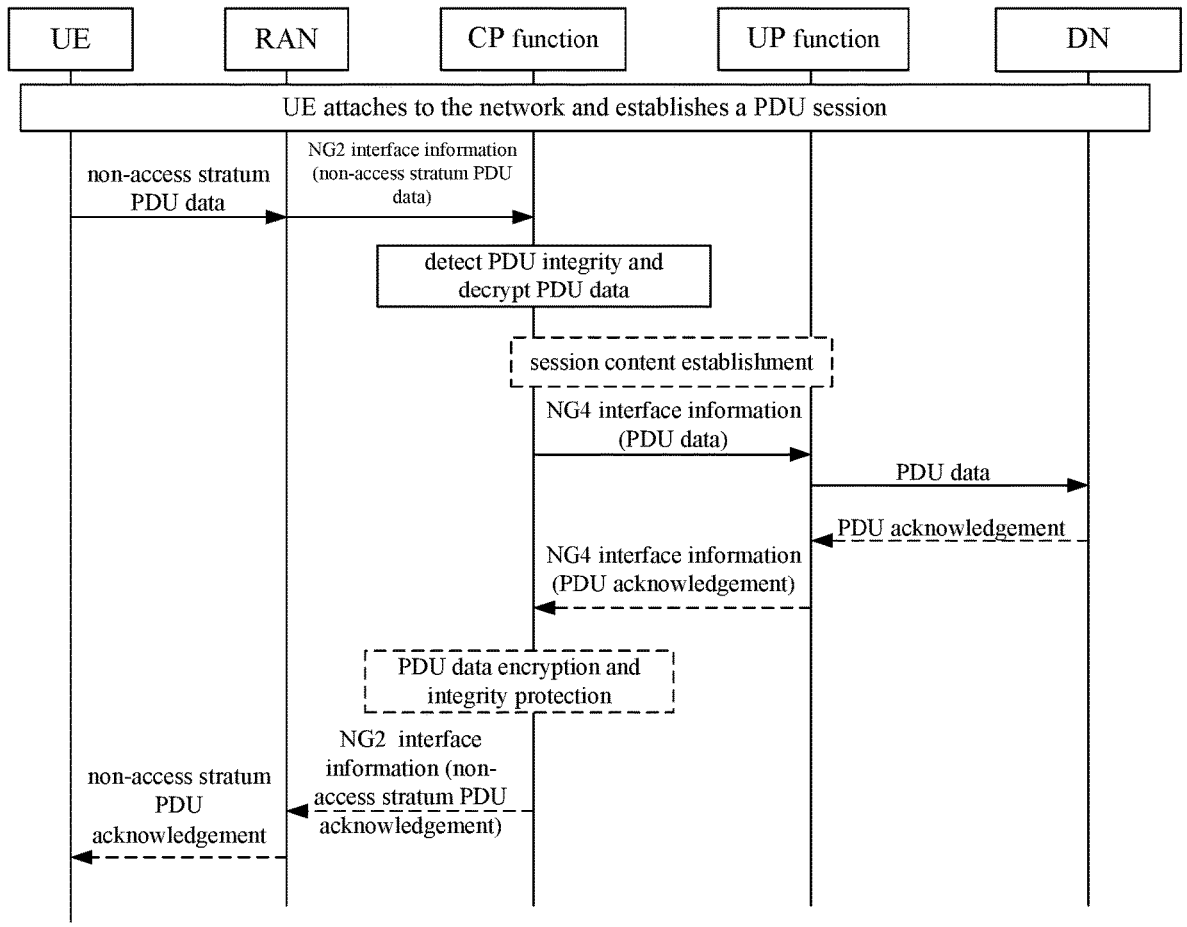
FIG. 2 is a schematic view of a transmission process of a MO data in the form of a non-access stratum PDU in some embodiments of the present disclosure.

Referring to FIG. 2 which is a schematic view of a transmission process of a MO data in the form of a non-access stratum Protocol Data Unit (PDU) in some embodiments of the present disclosure. As shown in FIG. 2, when the UE requests to attach to the network, the CP function may establish a PDU session according to the request, transmission capability or subscription data of the UE, and allocate an IP address for the UE. The UE sends an integrity protection Non-Access Stratum (NAS) PDU to the RAN, where the NAS PDU carries the encrypted PDU data, and the RAN sends the NAS PDU data to the CP function through the NG2 interface information, the CP function verifies the integrity of the received NAS PDU and decrypts the NAS PDU to obtain the PDU data. If the packet of the PDU data is an IP packet, the CP generates a session context by selecting an UP for the UE and allocating an IP address for the UE. For example, the CP function may select an UP function for the UE based on a type of service carried by the NAS PDU. The CP function sends the PDU data to the UP function according to the connection context of the UE, and at this time, the CP function still maintains a short online connection with the RAN to ensure that an Acknowledgement (ACK) information can be returned to the UE. The UP function forwards the PDU data to the DN network, and an Access Server (AS) in the DN network may return a downlink PDU (e.g., ACK) data packet to the UP function, and the UP function forwards the downlink PDU data to the CP function, the CP function encrypts the PDU data and performs an integrity protection on the encrypted PDU data. The PDU data is encapsulated into a NAS PDU, and the CP function sends the NAS PDU to the RAN through the NG2 interface information, and then the RAN forwards the NAS PDU to the UE.

Based on the above data transmission technology, a method of selecting a user plane gateway is provided in some embodiments of the present disclosure, applied to the CP function. The method of selecting a user plane gateway will be described in detail below in conjunction with embodiments. The UE described in the present disclosure may be terminal devices such as a mobile phone, a computer, a home appliance, a tablet personal computer, a laptop computer, a personal digital assistant (PDA), a mobile internet device (MID) a terminal device or a wearable device. It should be noted that the type of the UE is not limited in the embodiments of the present disclosure.

Figure 3:
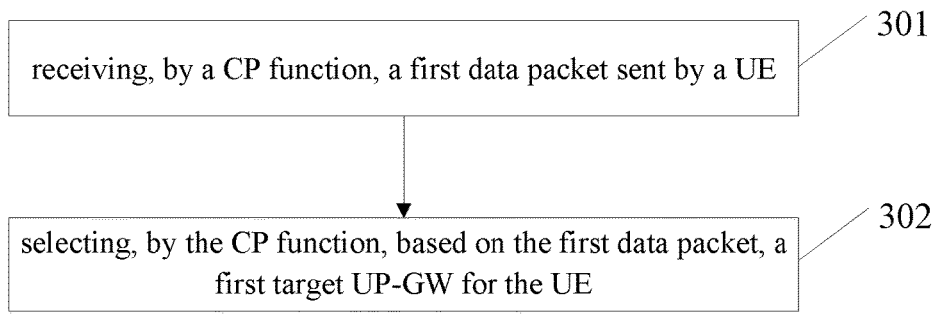
FIG. 3 is a flowchart of a method of selecting a user plane gateway in some embodiments of the present disclosure.

Referring to FIG. 3 which is a flowchart of a method of selecting a user plane gateway in some embodiments of the present disclosure, the method includes the following steps:

Step 301: receiving, by a control plane (CP) function, a first data packet sent by a user equipment (UE);

Step 302: selecting, by the CP function, based on the first data packet, a first target user plane gateway (UP-GW) for the UE.

In some embodiments of the present disclosure, the UE sends a first data packet to the RAN, and the RAN forwards the first data packet sent by the UE to the CP function, the CP function receives from the RAN the first data packet of the UE forwarded by the RAN. The CP function may be an MM function or an SM function, that is, the MM function may select a first target UP-GW for the UE, or the SM function may select a first target UP-GW for the UE, which is not limited herein.

Figure 4:
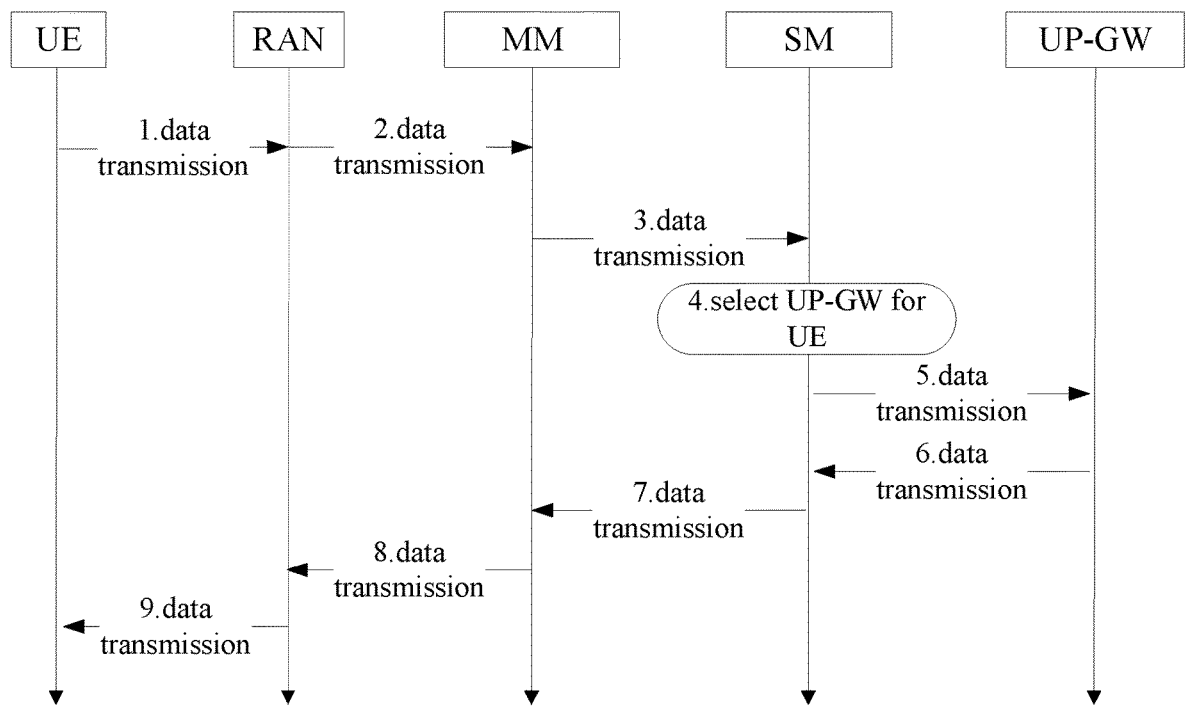
FIG. 4 is a schematic view of a data transmission in some embodiments of the present disclosure.

Referring to FIG. 4 which is a schematic view of a data transmission in some embodiments of the present disclosure. The embodiment shown in FIG. 4 is that the SM function selects the first target UP-GW for the UE. As shown in FIG. 4, the UE sends a first data packet to the RAN, the RAN forwards the first data packet to the MM function, and the MM function receives the first data packet and forwards the same to the SM function, the SM function selects a first target UP-GW for the UE based on the first data packet after receiving the first data packet. In some embodiments of the present disclosure, the SM function allocates an IP address to the UE when the UE requests an attachment, and feeds back the IP address to the UE, the UE sends the first data packet carrying the IP address, and the first target UP-GW forwards the first data packet to the DN according to the IP address after receiving the first data packet.

Figure 5:
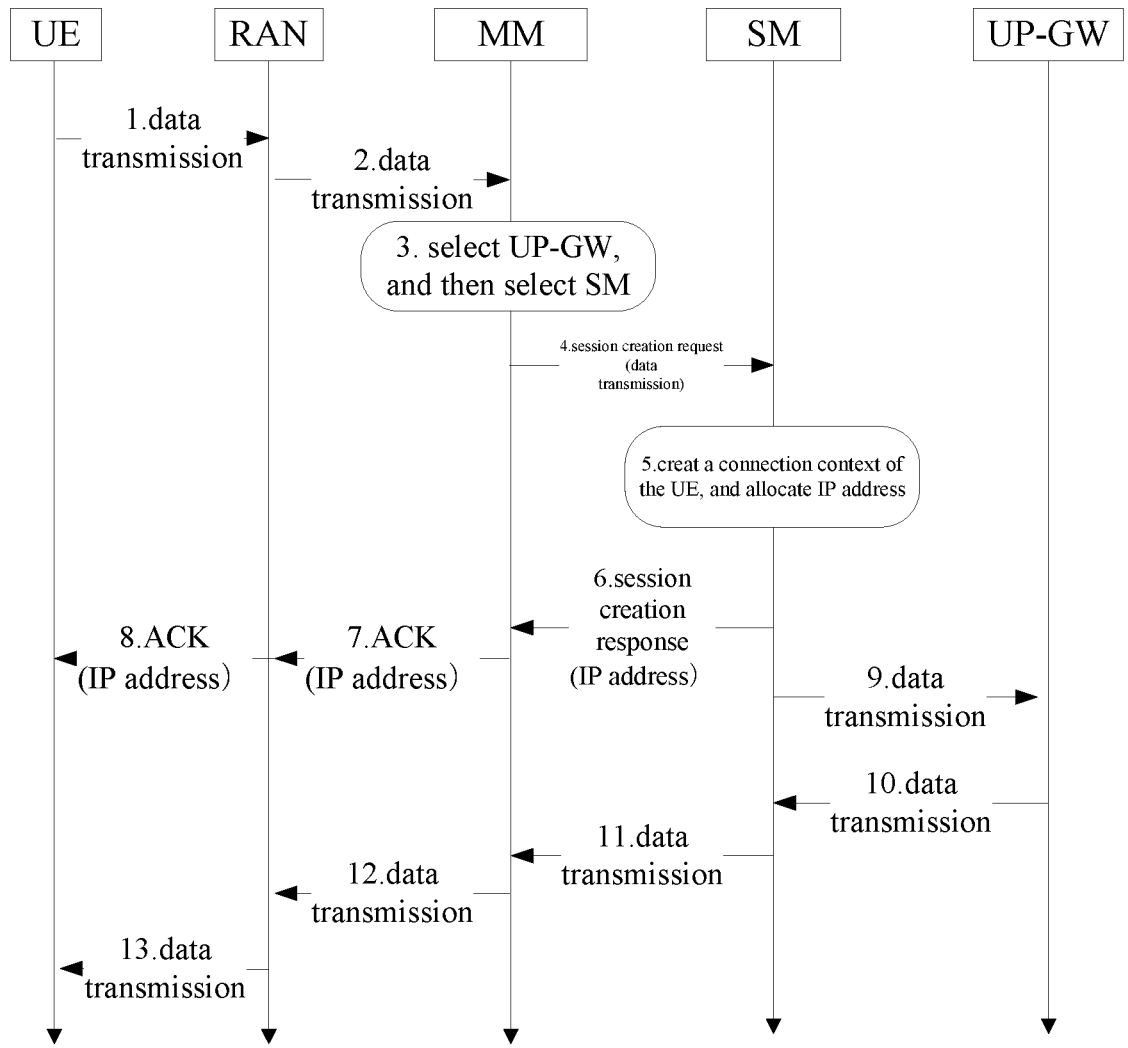
FIG. 5 is a schematic view of a data transmission in some embodiments of the present disclosure.

Referring to FIG. 5 which is a schematic view of a data transmission in some embodiments of the present disclosure, the embodiment shown in FIG. 5 is that the MM function selects the first target UP-GW for the UE. As shown in FIG. 5, after the MM function receives the first data packet sent by the UE which is forwarded by the RAN, the MM function selects a first target UP-GW for the UE based on the first data packet.

In some embodiments of the present disclosure, prior to the Step 301, the method may further include a process of requesting an attachment by the UE. To be specific, the UE sends an attaching request to the CP function, the CP function acquires subscription information of the UE based on the attaching request, determines whether the UE is a IoT user based on the subscription information of the UE. In the case that the UE is an IoT user, the CP function does not select an UP-GW for the UE, but selects the UP-GW for the UE after receiving the first data packet sent by the UE.

In some embodiments of the present disclosure, the CP function sends the first data packet to the first target UP-GW after the selecting the first target UP-GW for the UE. When the CP function receives the second data packet sent by the UE after the UE selects the first target UP-GW, the CP function may reselect an UP-GW for the UE, or may not reselect an UP-GW for the UE. For example, the CP function may switch on a timer based on the first target UP-GW, and determine whether the timer expires when receiving the second data packet sent by the UE. In the case that the timer expires, the CP function reselects an UP-GW for the UE. In the case that the timer does not expire, the CP function may reselect a UP-GW for the UE. In this way, the method enables the UE to better adapt to the UP load (for example, can choose to attach a lighter UP), and also adapt well to changes in the network topology (e.g., an increase in UP, etc.). In addition, the method is also capable of optimizing the path and reducing the delay.

In some embodiments of the present disclosure, the CP function selects the first target UP-GW for the UE based on one or more of: subscription information of the UE, a location of the UE, a type of the UE, a UP load and a network topology.

Optionally, the method further includes:

sending, by the CP function, the first data packet to the first target UP-GW.

In some embodiments of the present disclosure, the CP function sends the first data packet to the first target UP-GW after selecting the first target UP-GW. To be specific, as shown in FIG. 4, when the CP function is an SM function, the SM function sends the first data packet to the first target UP-GW. As shown in FIG. 5, when the CP function is an MM function, the MM function selects a target SM function for the UE based on the first target UP-GW after selecting the first target UP-GW, and then sends the first data packet to the target SM function, the target SM function sends the first data packet to the first target UP-GW.

Figure 6:
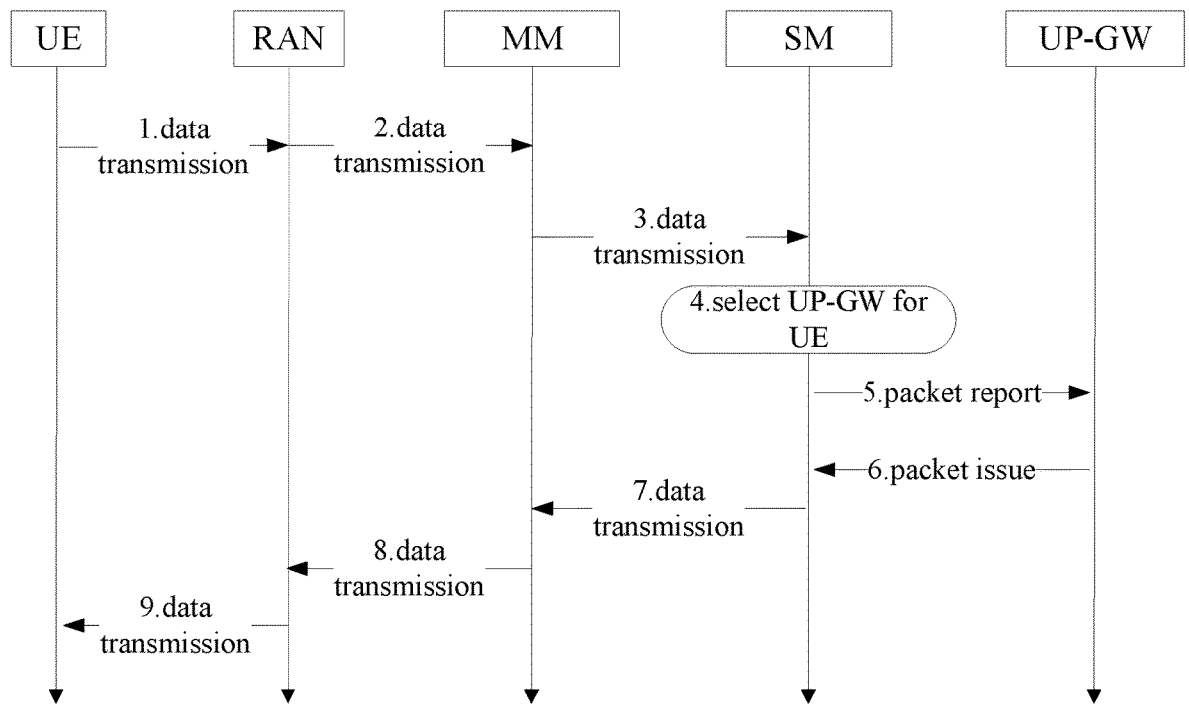
FIG. 6 is a schematic view of a data transmission in some embodiments of the present disclosure.
Figure 7:
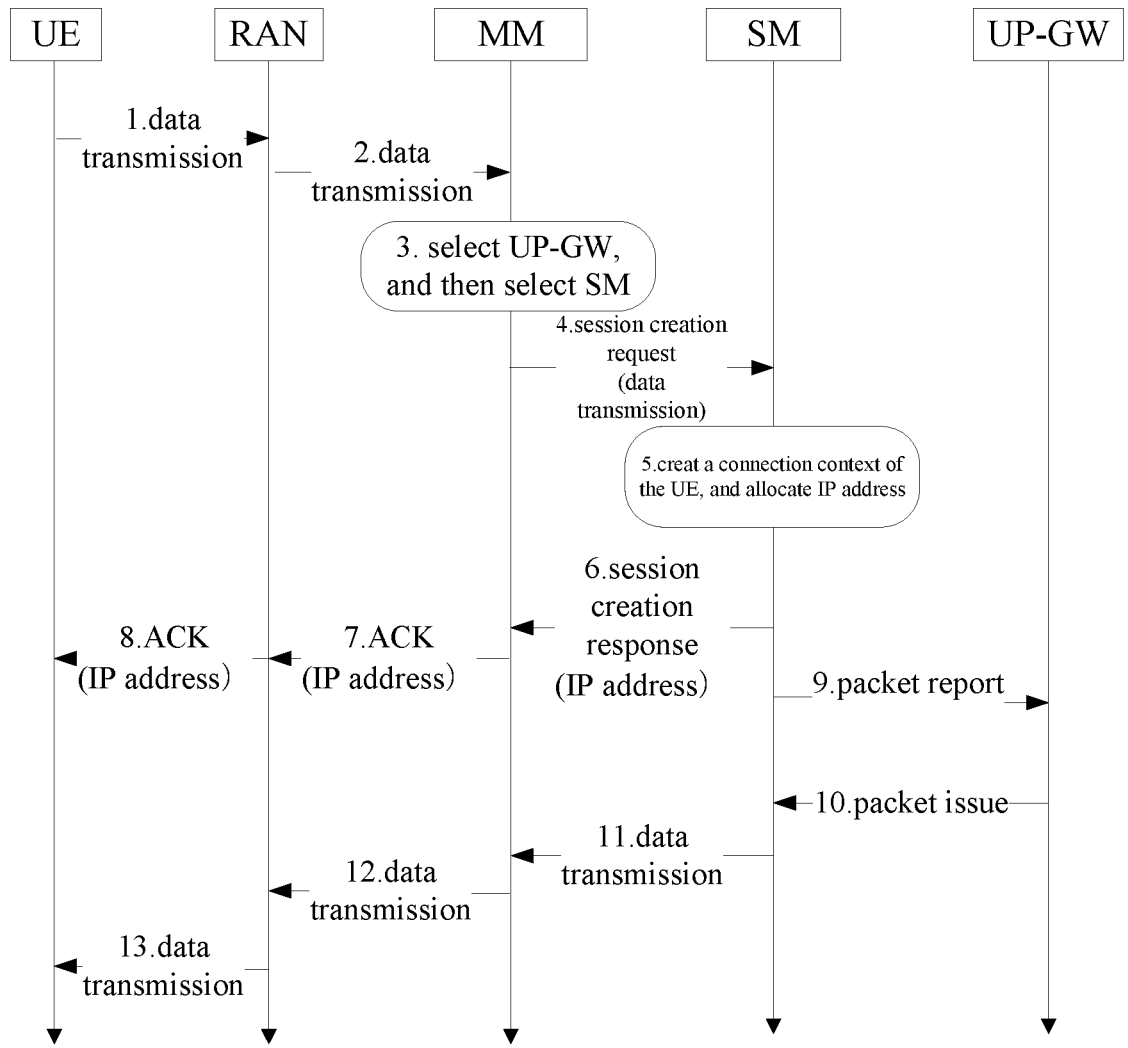
FIG. 7 is a schematic view of a data transmission in some embodiments of the present disclosure.

It can be understood that, the first data packet may be transmitted by using an ordinary data transmission method, or may be transmitted based on a Software Defined Network (SDN), that is, using the OpenFlow protocol for the data transmission. Referring to FIG. 6 and FIG. 7 which are respectively schematic views of data transmission based on SDN in some embodiments of the present disclosure, the CP function receives, in the first data transmission, the CP function "Packet in" (reporting the packet) the first data packet to the first target UP-GW. It should be noted that the data transmission diagrams shown in FIG. 6 and FIG. 7 are different in the forwarding manner of the CP function when the data is transmitted based on the SDN, that is, the packet in/out in FIG. 6 and FIG. 7 (the message is reported/issued) is different from the data transmission in FIG. 4 and FIG. 5.

Optionally, subsequent to the selecting, by the CP function, the first target UP-GW for the UE based on the first data packet, the method further includes:

switching on a timer by the CP function based on the first target UP-GW;

receiving, by the CP function, a second data packet sent by the UE;

determining, by the CP function, whether the timer expires;

selecting, by the CP function, a second target UP-GW for the UE in the case that the timer expires; and sending, by the CP function, the second data packet to the second target UP-GW In some embodiments of the present disclosure, the CP function switches on the timer based on the first target UP-GW, that is, the CP function may switch on the timer after selecting the first target UP-GW for the UE. The CP function may switch on the timer immediately after selecting the first target UP-GW, or may switch on the timer after selecting the first target UP-GW and sending the first data packet to the first target UP-GW, which is not limited herein.

When the CP function receives the second data packet sent by the UE, the CP function determines whether the timer expires. If the timer expires, the CP function selects a second target UP-GW function for the UE. The UP-GW function, that is, when the timer expires, the CP function reselects the UP-GW function for the UE. The second target UP-GW may be the same as the first target UP-GW, or may be different from the first target UP-GW, that is, the UP-GW reselected by the CP function for the UE may be the same as the previously selected UP-GW, or it may be different from the previously selected UP-GW. It should be noted that the timing of the timer is not limited in the embodiment of the present disclosure, which may be any time set according to the UE type, the UP load, or the network topology.

The second data packet is sent to the second target UP-GW after the CP function determines the second target UP-GW for the UE, so that the CP function may, in the case that the time expires, reselect the UP-GW for the UE according to the subscription information of the UE, the location information of the UE, the type information of the UE, the UP load, or the network topology, etc., so that the UP-GW of the UE can be updated in time to avoid the unbalanced UP load when the UP-GW of the UE does not update for a long time, thereby improving the data transmission rate.

Optionally, the method further includes:

sending, by the CP function, the second data packet to the first target UP-GW in the case that the timer does not expire.

Figure 8:
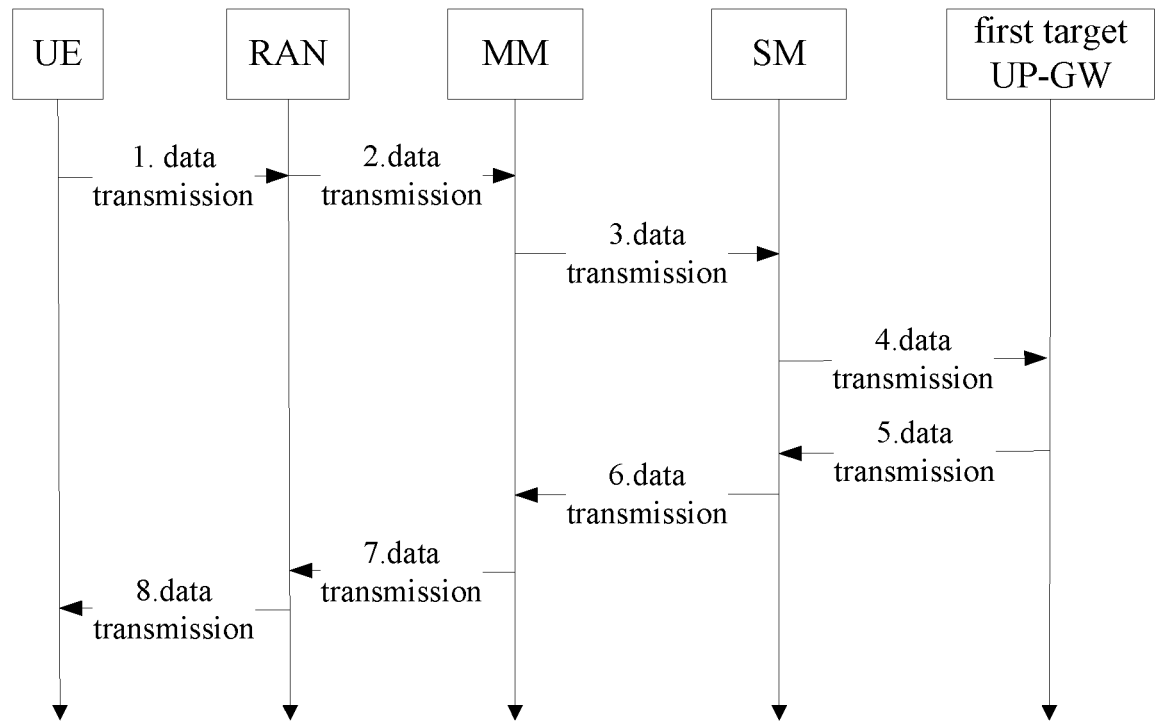
FIG. 8 is a schematic view of a data transmission in some embodiments of the present disclosure.
Figure 9:
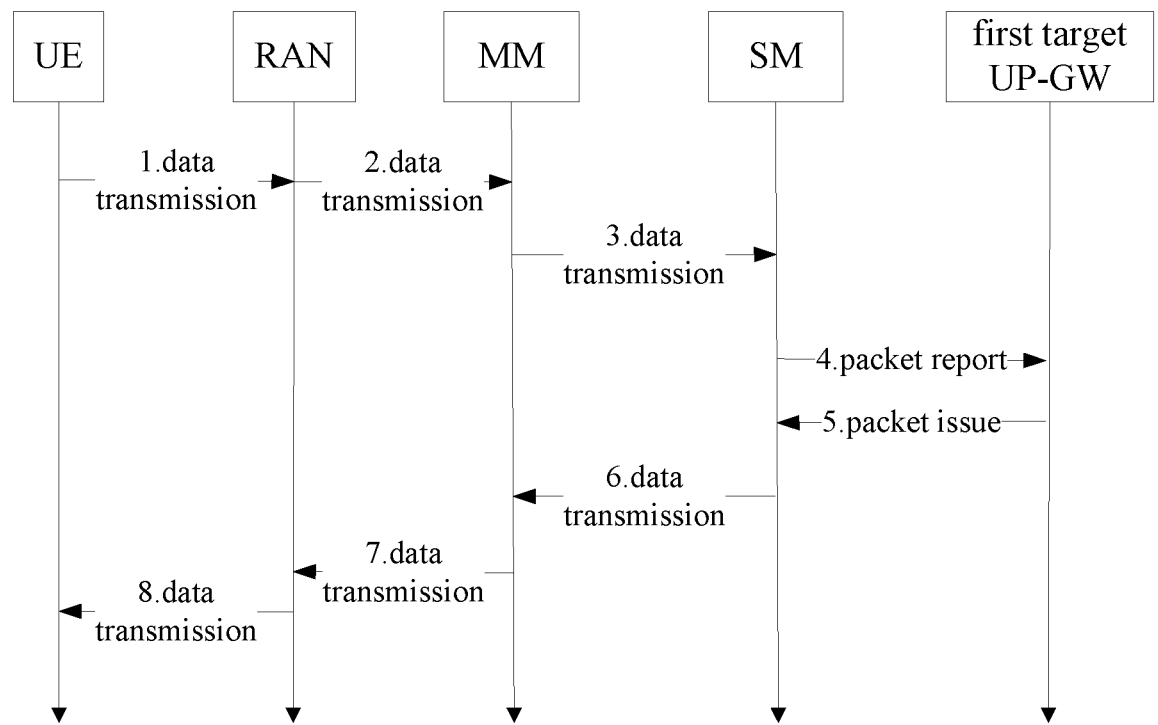
FIG. 9 is a schematic view of a data transmission in some embodiments of the present disclosure.

In some embodiments of the present disclosure, in the case that the timer does not expire, the CP function does not re-determine the UP-GW for the UE, and the CP function sends the second data packet to the first target UP-GW. Referring to FIG. 8 and FIG. 9 which are schematic views of data transmission in some embodiments of the present disclosure, after the CP function receives the second data packet sent by the UE, the CP function does not re-select the UP-GW for the UE, but directly send the second data packet to the first target UP-GW, where the SDN-based data transmission is shown in FIG. 9, the CP function forwards the second data packet in a Packet in/out manner. In this way, the method can effectively control the frequency of the UP-GW update, and does not need to select the UP-GW for the UE each time the UE sends a data packet, thereby effectively saving network resources and improving data transmission efficiency.

Optionally, prior to the receiving, by the CP function, the first data packet sent by the UE, the method further includes:

receiving, by the CP function, an attaching request sent by the UE;

acquiring, by the CP function, based on the attaching request, subscription information of the UE; and determining, by the CP function, based on the subscription information of the UE, whether the UE is an Internet of Things (IoT) user;

in the case that the UE is an IoT user, selecting, by the CP function, no UP-GW for the UE, and sending, by the CP function, an attaching acception message to the UE.

Figure 10:
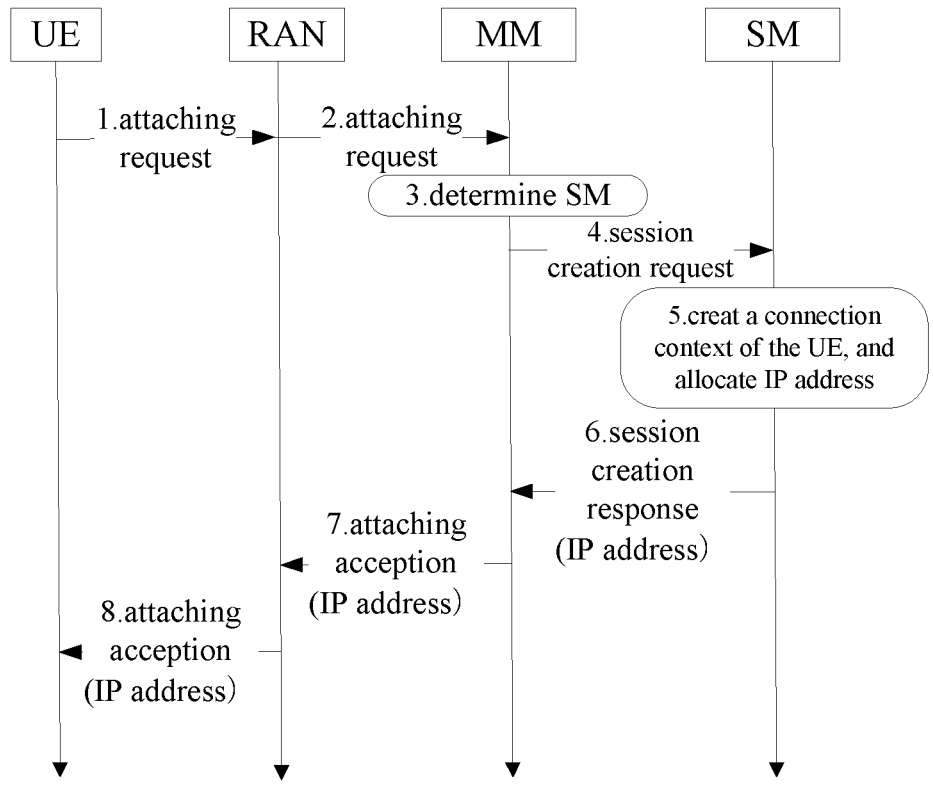
FIG. 10 is a schematic view of a signaling transmission in some embodiments of the present disclosure.
Figure 11:
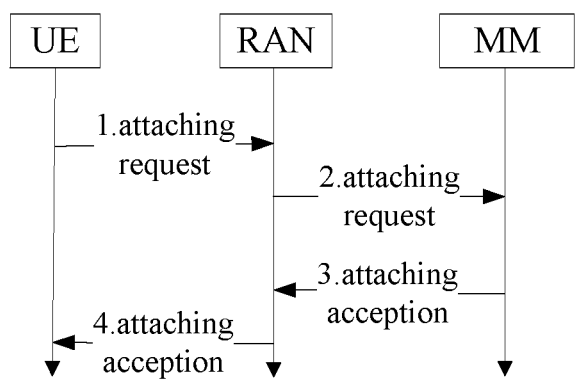
FIG. 11 is a schematic view of a signaling transmission in some embodiments of the present disclosure.

In some embodiments of the present disclosure, the CP function further receives the attaching request information sent by the UE before receiving the first data packet sent by the UE, the CP function acquires the subscription information of the UE according to the attaching request information, and then determines, according to the subscription information of the UE, whether the UE is an IoT user. If the UE is an IoT user, the CP function does not select an UP-GW for the UE and sends an attaching acception message to the UE, as shown in FIGS. 10 and 11. In this way, when the UE is an IoT user, the UP-GW is not selected for the UE when the UE attaches, instead the UP-GW is selected for the UE when receiving the data packet sent by the UE. Therefore, it is able to integrate the real-time information (such as the UE location information, the UP load, or the network topology, etc.) to select an appropriate UP-GW for the UE, and avoid the unbalanced UP load due to selecting the UP-GW for the UE too early.

In some embodiments of the present disclosure, the attaching request carries identification information of the UE, and the CP function acquires the subscription information of the UE (e.g., user attributes, application IDs, etc.) from the subscription database according to identification information of the UE (e.g., User ID).

Optionally, the CP function selects the first target UP-GW for the UE based on one or more of:

subscription information of the UE, a location of the UE, a type of the UE, a UP load and a network topology.

In some embodiments of the present disclosure, the CP function selects the first target UP-GW for the UE based on one or more of: subscription information of the UE, a location of the UE, a type of the UE, a UP load and a network topology. The type of the UE may be, for example, a sensor, an in-vehicle device, or the like. In some embodiments of the present disclosure, the attaching request information sent by the UE further carries the identification information (for example, a BS ID, i.e., a base station identification code) of an access network entity (for example, a base station), and the CP function may determine the location information of the UE according to the identification information of the access network entity, so that the first target UP-GW can be selected for the UE based on the location information of the UE.

Optionally, prior to the receiving, by the CP function, the first data packet sent by the UE, the method further includes:

receiving, by the CP function, a session creation request sent by a mobility management (MM) function, where the session creation request is generated by the MM function based on an attaching request sent by the UE;

creating, by the CP function, based on the session creation request, a connection context of the UE, and allocating an IP address for the UE; and sending to the MM function, by the CP function, a session creation response carrying the IP address.

In some embodiments of the present disclosure, the CP function is an SM function. Referring to FIG. 10, after the MM function receives the attaching request sent by the UE, the MM function determines a target SM function for the UE, and then sends a session creation request to the target SM function based on the attaching request, the target SM function, after receiving the session creation request, creates a connection context of the UE according to the session creation request, and allocates an IP address for the UE, and then sends a session creation response carrying the IP address to the MM function. The MM function sends the attaching acception message carrying the IP address to the UE after receiving the session creation response carrying the IP address. The manner in which the SM function creates a connection context of the UE according to the session request and allocates an IP address to the UE belongs to the related technical field, so the details thereof are not described herein.

In some embodiments of the present disclosure, the SM function may fill the IP address allocated to the UE into the first data packet after receiving the first data packet, and then send the first data packet to the first target UP-GW, and the first target UP-GW sends the first data packet to the DN according to the IP address.

Optionally, subsequent to the receiving, by the CP function, the first data packet sent by the UE, the method further includes:

receiving, by the CP function, a session deletion request sent by the MM function, where the session deletion request is generated by the MM function based on a detaching request sent by the UE;

deleting, by the CP function, the connection context of the UE and the IP address of the UE; and sending, by the CP function, a session deletion response to the MM function.

Figure 12:
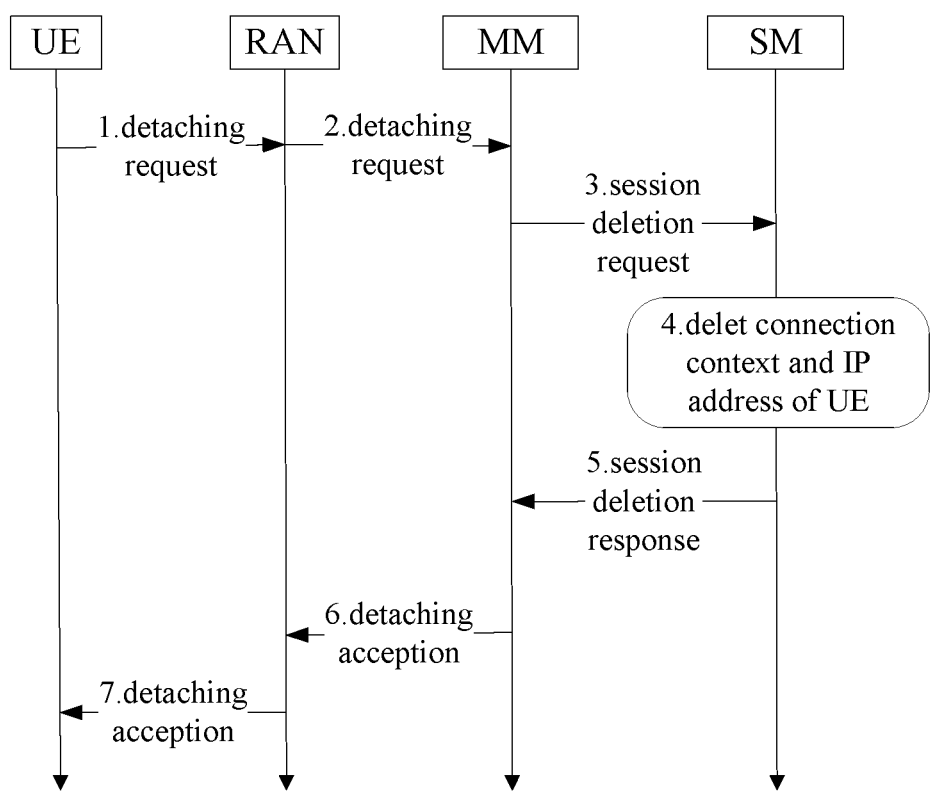
FIG. 12 is a schematic view of a signaling transmission in some embodiments of the present disclosure.

In some embodiments of the present disclosure, the CP function is an SM function. Referring to FIG. 12 which is a schematic view of a signaling transmission in some embodiments of the present disclosure, after receiving the detaching request sent by the UE, the MM function sends a session deletion request to the SM function based on the attaching request, the SM function receives the session deletion request sent by the MM function, and deletes a connection context of the UE and an IP address of the UE according to the session deletion request. The SM function sends a session deletion response to the MM function, and the MM function sends a detaching acception message to the UE based on the session deletion response.

Optionally, subsequent to the selecting, by the CP function, based on the first data packet, the first target UP-GW for the UE, the method further includes:

selecting, by the CP function, based on the first target UP-GW, a target session management (SM) function for the UE;

sending, by the CP function, a session creation request to the target SM function, where the session creation request is configured to trigger the target SM function to create a connection context of the UE and allocate an IP address for the UE;

receiving, by the CP function, a session creation response sent by the target SM function and carrying the IP address; and sending to the UE, by the CP function, based on the session creation response, an acknowledgement (ACK) message carrying the IP address.

In some embodiments of the present disclosure, the CP function is an MM function. Referring to FIG. 5 and FIG. 7, after the MM function selects the first target UP-GW for the UE, the MM function may further select a target SM function for the UE based on the first target UP-GW. In some embodiments of the present disclosure, the MM function selects a target SM function for the UE based on the related information (e.g., location information) of the UP-GW. The MM function sends a session creation request to the target SM function after determining the target SM function, and the target SM function creates a connection context of the UE based on the session creation request, and allocates an IP address for the UE. The target SM function sends a session creation response carrying the IP address to the MM function, and the MM function sends an ACK message carrying the IP address to the UE based on the session creation response.

Figure 13:
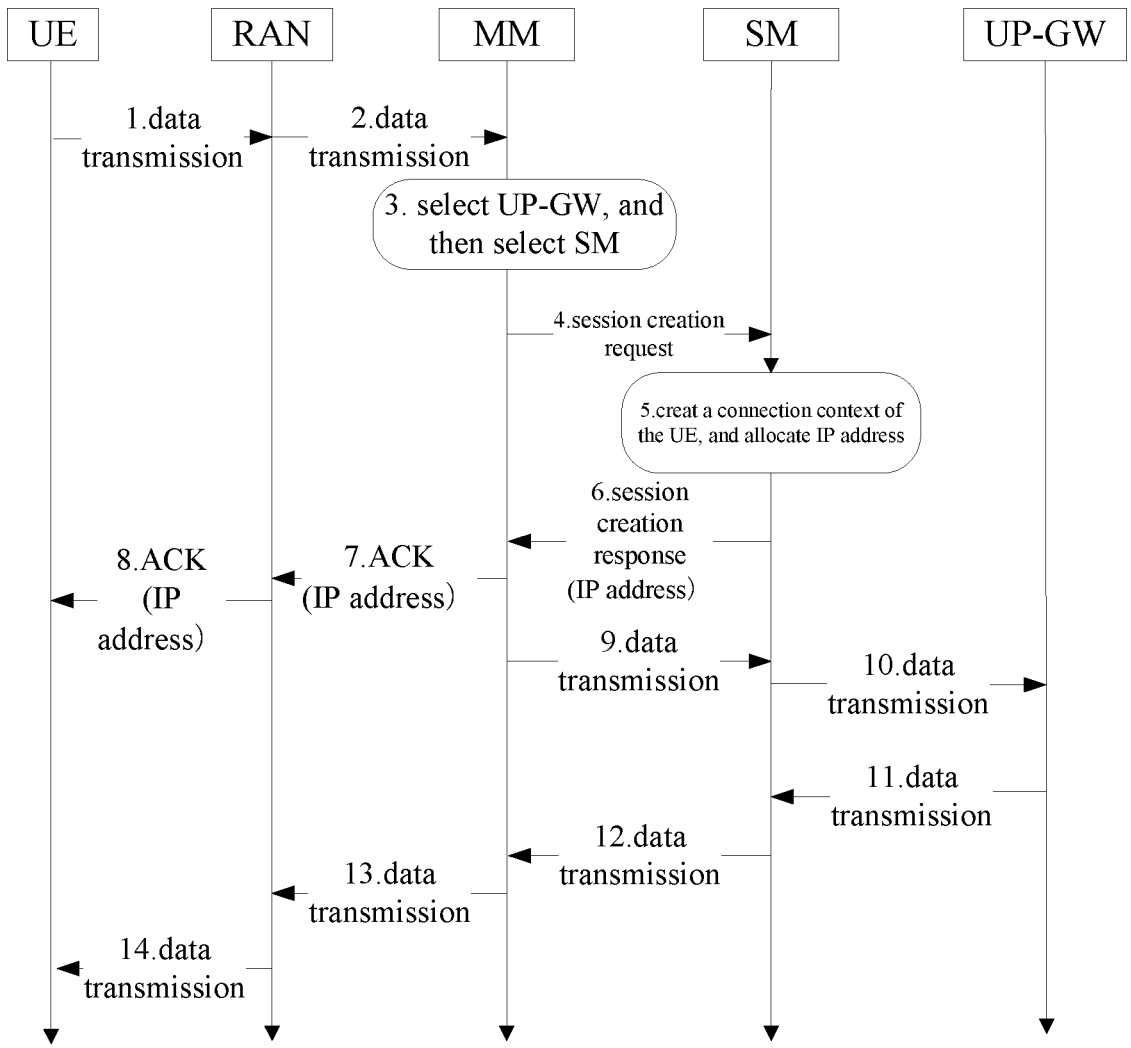
FIG. 13 is a schematic view of a data transmission in some embodiments of the present disclosure.
Figure 14:
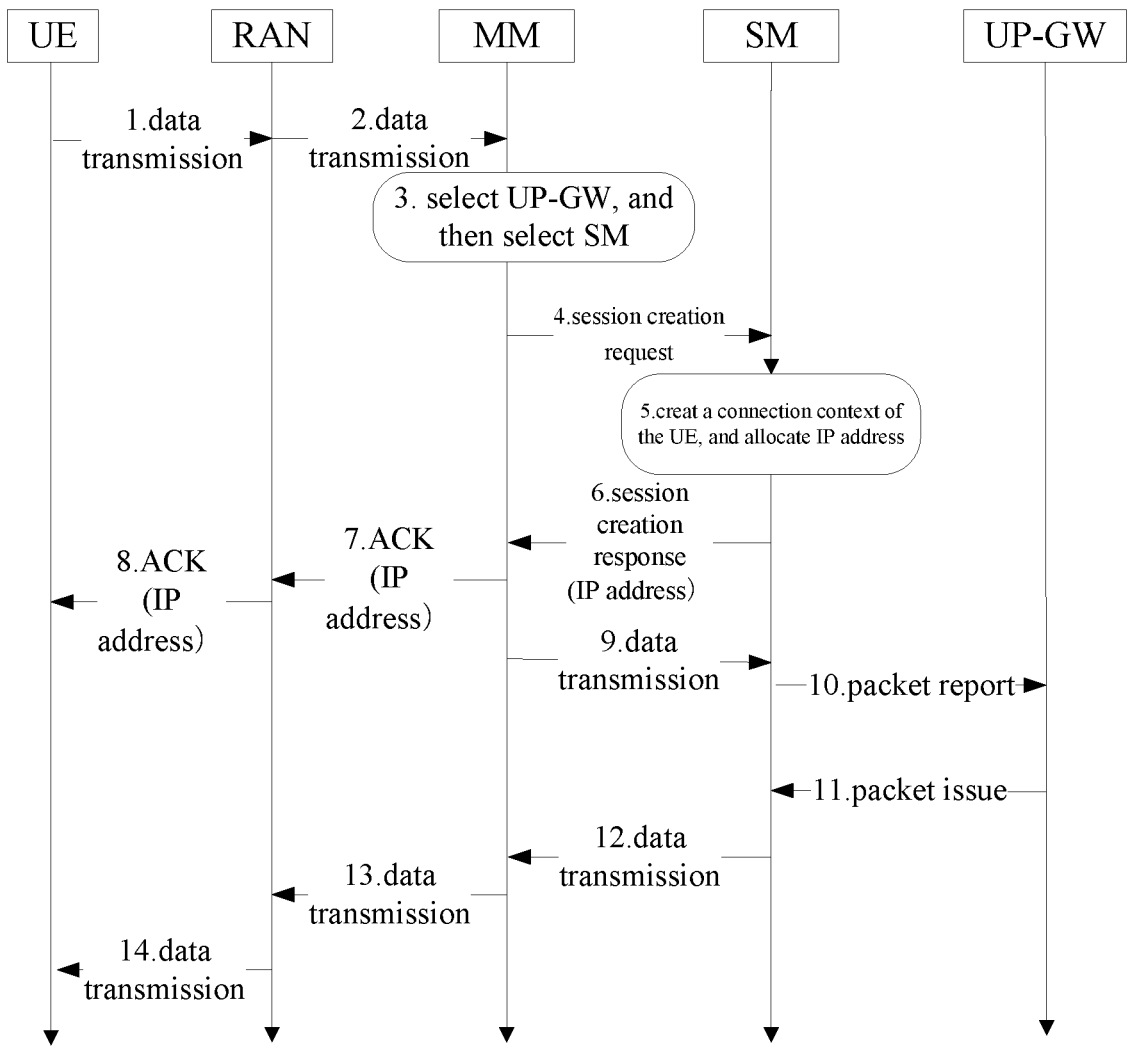
FIG. 14 is a schematic view of a data transmission in some embodiments of the present disclosure.

In some embodiments of the present disclosure, the MM function may send the first data packet to the target SM function while sending a session creation request to the SM function, as shown in FIGS. 5 and 7. The MM function may also send the first data packet to the target SM function after receiving the session creation response sent by the target SM function, as shown in FIG. 13 and FIG. 14.

Optionally, the sending, by the CP function, the session creation request to the target SM function includes:

sending, by the CP function, the session creation request and the first data packet to the target SM function.

In some embodiments of the present disclosure, the CP function is an MM function. Referring to FIG. 13 and FIG. 14 which are schematic views of data transmission in some embodiments of the present disclosure, where FIG. 13 is a schematic view of a general data transmission, and FIG. 14 is a schematic view of a data transmission based on SDN. As shown in FIGS. 13 and 14, the MM function sends the first data packet to the target SM function while transmitting the session creation request to the target SM function, so that the target SM function can send the first data packet to the first target UP-GW immediately after sending the session creation response to the MM function, without waiting for the MM function to send the first data packet after sending the session creation response to the MM function and then forwarding the first data packet to the first target UP-GW, thereby effectively saving the data transmission time and improving the transmission efficiency.

Optionally, the method further includes:

receiving, by the CP function, a detaching request sent by the UE;

sending, by the CP function, a detaching acception message to the UE, and deleting a signaling connection with the UE.

Figure 15:
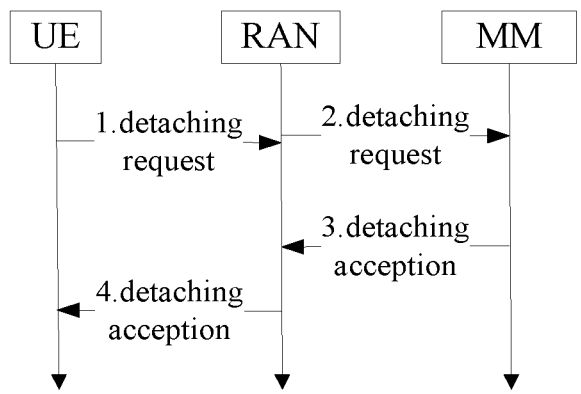
FIG. 15 is a schematic view of a signaling transmission in some embodiments of the present disclosure.

In some embodiments of the present disclosure, the CP function is an MM function. Referring to FIG. 15 which is a schematic view of a signaling transmission in some embodiments of the present disclosure, the MM function receives a detaching request sent by the UE, and deletes a signaling connection with the UE based on the detaching request and sends a detaching acception message to the UE. The RAN and the UE also delete the signaling connection after receiving the detaching acception message.

Optionally, the CP function is an SM function.

In some embodiments of the present disclosure, the CP function is an SM function, and the case where the CP function is an SM function has been described in the above description of the present disclosure, and details thereof are not described herein again.

Optionally, the CP function is an MM function.

In some embodiments of the present disclosure, the CP function is an MM function, and the case where the CP function is an MM function has been described in the above description of the present disclosure, and details thereof are not described herein again.

According to the embodiments of the present disclosure, the CP function receives the first data packet sent by the UE, and the CP function selects the first target UP-GW for the UE based on the first data packet. In this way, according to the method of selecting a user plane gateway of the present disclosure, an UP-GW is selected for the UE when receiving the data packet sent by the UE, so as to enable the data transmission to better adapt to changes of the UP load and the network topology, thereby improving the data transmission efficiency.

Figure 16:
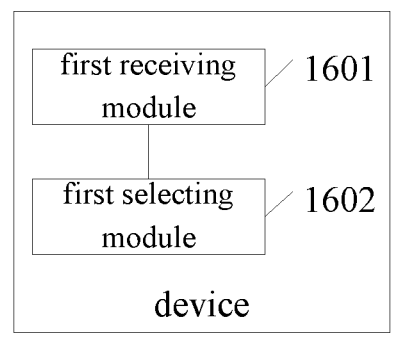
FIG. 16 is a schematic view of a device of selecting a user plane gateway in some embodiments of the present disclosure.

Referring to FIG. 16 which is a schematic view of a device of selecting a user plane gateway in some embodiments of the present disclosure, the device of selecting a user plane gateway includes:

a first receiving module 1601, configured to receive a first data packet sent by a user equipment (UE);

a first selecting module 1602, configured to select, based on the first data packet, a first target user plane gateway (UP-GW) for the UE.

Figure 17:
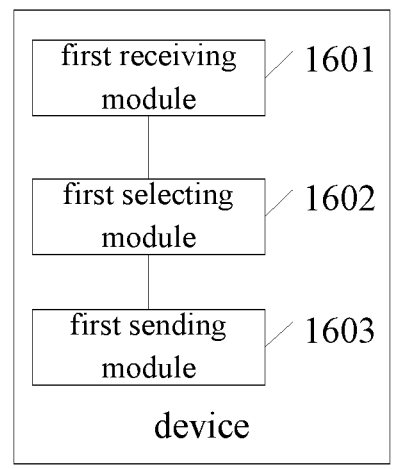
FIG. 17 is a schematic view of a device of selecting a user plane gateway in some embodiments of the present disclosure.

Optionally, referring to FIG. 17 which is a schematic view of a device of selecting a user plane gateway in some embodiments of the present disclosure, the device further includes:

a first sending module 1603, configured to send the first data packet to the first target UP-GW.

Figure 18:
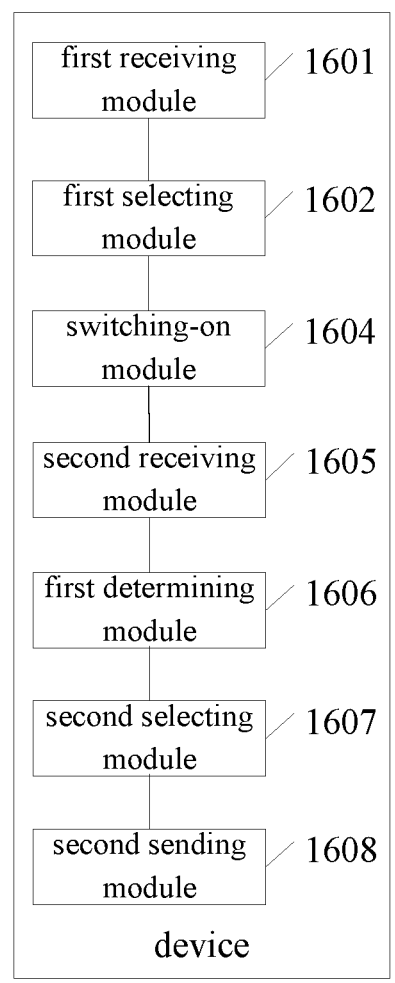
FIG. 18 is a schematic view of a device of selecting a user plane gateway in some embodiments of the present disclosure.

Optionally, referring to FIG. 18 which is a schematic view of a device of selecting a user plane gateway in some embodiments of the present disclosure, the device further includes:

a switching-on module 1604, configured to switch on a timer based on the first target UP-GW;

a second receiving module 1605, configured to receive a second data packet sent by the UE;

a first determining module 1606, configured to determine whether the timer expires;

a second selecting module 1607, configured to select a second target UP-GW for the UE in the case that the timer expires; and a second sending module 1608, configured to send the second data packet to the second target UP-GW.

Figure 19:
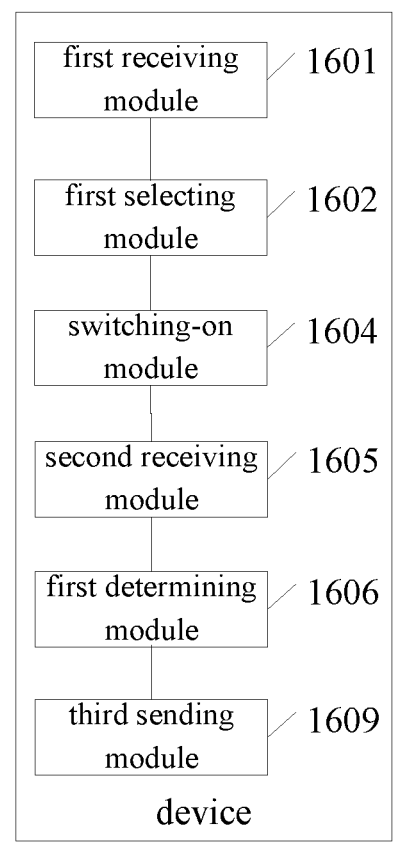
FIG. 19 is a schematic view of a device of selecting a user plane gateway in some embodiments of the present disclosure.

Optionally, referring to FIG. 19 which is a schematic view of a device of selecting a user plane gateway in some embodiments of the present disclosure, the device further includes:

a third sending module 1609, configured to send the second data packet to the first target UP-GW in the case that the timer does not expire.

Figure 20:
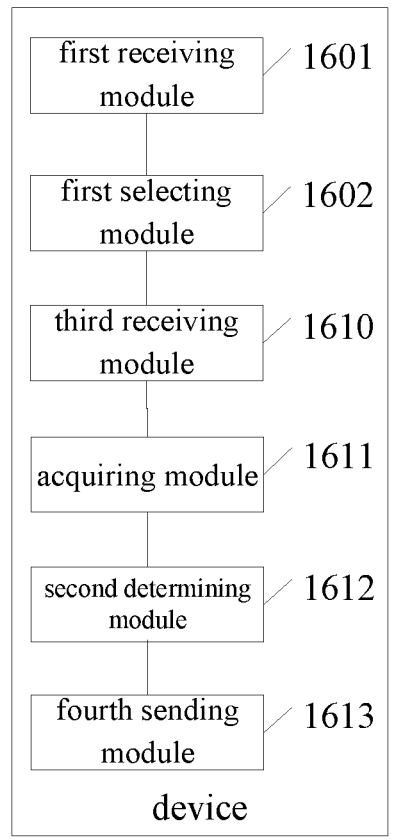
FIG. 20 is a schematic view of a device of selecting a user plane gateway in some embodiments of the present disclosure.

Optionally, referring to FIG. 20 which is a schematic view of a device of selecting a user plane gateway in some embodiments of the present disclosure, the device further includes:

a third receiving module 1610, configured to receive an attaching request sent by the UE;

an acquiring module 1611, configured to acquire, based on the attaching request, subscription information of the UE;

a second determining module 1612, configured to determine based on the subscription information of the UE, whether the UE is an Internet of Things (IoT) user; and a fourth sending module 1613, configured to, in the case that the UE is an IoT user, select no UP-GW for the UE and send an attaching acception message to the UE.

Optionally, the first selecting module is configured to select the first target UP-GW for the UE based on one or more of: subscription information of the UE, a location of the UE, a type of the UE, a UP load and a network topology.

Figure 21:
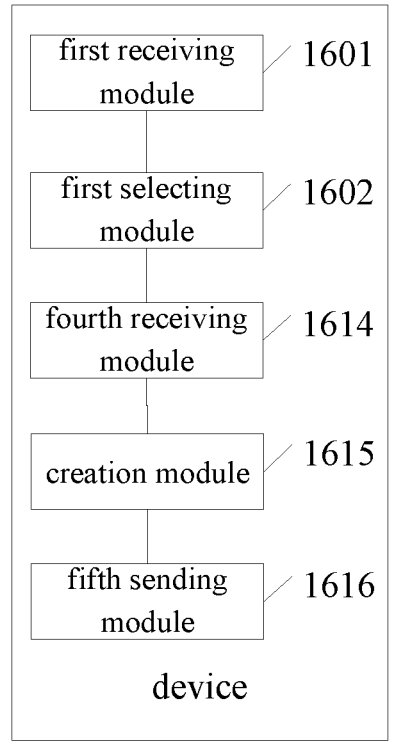
FIG. 21 is a schematic view of a device of selecting a user plane gateway in some embodiments of the present disclosure.

Optionally, referring to FIG. 21 which is a schematic view of a device of selecting a user plane gateway in some embodiments of the present disclosure, the device further includes:

a fourth receiving module 1614, configured to receive a session creation request sent by a mobility management (MM) function, where the session creation request is generated by the MM function based on an attaching request sent by the UE;

a creation module 1615, configured to create, based on the session creation request, a connection context of the UE, and allocate an IP address for the UE; and a fifth sending module 1616, configured to send to the MM function a session creation response carrying the IP address.

Figure 22:
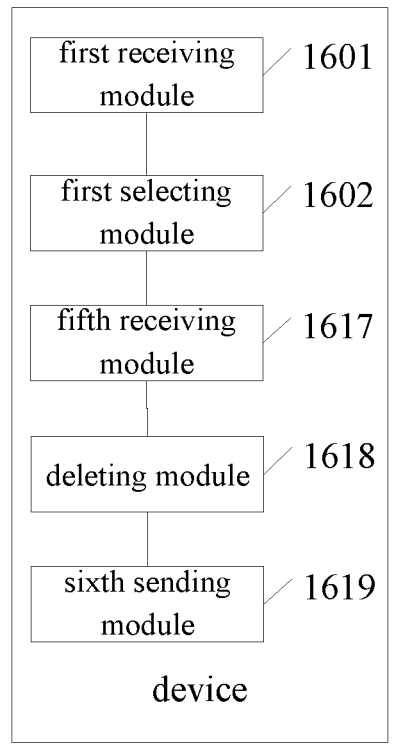
FIG. 22 is a schematic view of a device of selecting a user plane gateway in some embodiments of the present disclosure.

Optionally, referring to FIG. 22 which is a schematic view of a device of selecting a user plane gateway in some embodiments of the present disclosure, the device further includes:

a fifth receiving module 1617, configured to receive a session deletion request sent by the MM function, where the session deletion request is generated by the MM function based on a detaching request sent by the UE;

a deleting module 1618, configured to delete the connection context of the UE and the IP address of the UE; and a sixth sending module 1619, configured to send a session deletion response to the MM function.

Figure 23:
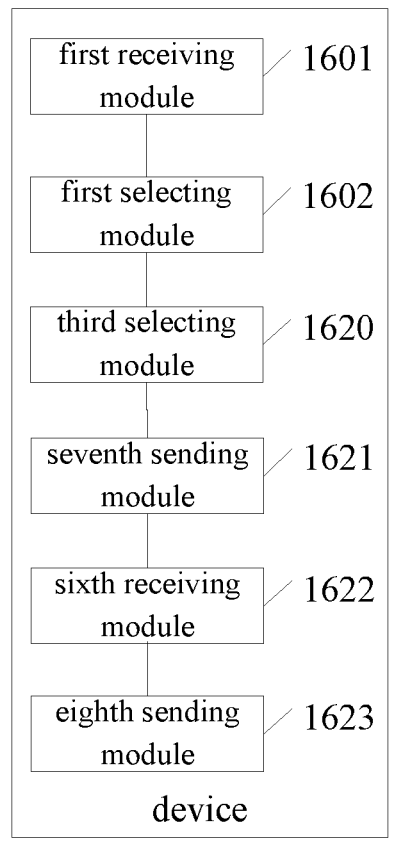
FIG. 23 is a schematic view of a device of selecting a user plane gateway in some embodiments of the present disclosure.

Optionally, referring to FIG. 23 which is a schematic view of a device of selecting a user plane gateway in some embodiments of the present disclosure, the device further includes:

a third selecting module 1620, configured to select, based on the first target UP-GW, a target session management (SM) function for the UE;

a seventh sending module 1621, configured to send a session creation request to the target SM function, where the session creation request is configured to trigger the target SM function to create a connection context of the UE and allocate an IP address for the UE;

a sixth receiving module 1622, configured to receive a session creation response sent by the target SM function and carrying the IP address; and an eighth sending module 1623, configured to send to the UE, based on the session creation response, an acknowledgement (ACK) message carrying the IP address.

Optionally, the seventh sending module 1621 is configured to send the session creation request and the first data packet to the target SM function.

Figure 24:
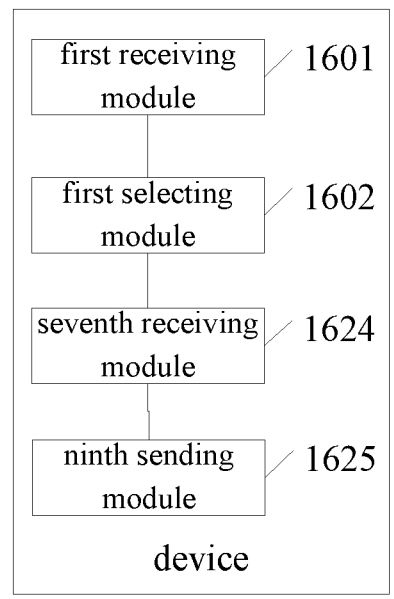
FIG. 24 is a schematic view of a device of selecting a user plane gateway in some embodiments of the present disclosure.

Optionally, referring to FIG. 24 which is a schematic view of a device of selecting a user plane gateway in some embodiments of the present disclosure, the device further includes:

a seventh receiving module 1624, configured to receive a detaching request sent by the UE;

a ninth sending module 1625, configured to send a detaching acception message to the UE, and delete a signaling connection with the UE.

Optionally, the user plane gateway selection device is an SM function entity.

Optionally, the user plane gateway selection device is an MM function entity.

It should be noted that, in some embodiments of the present disclosure, the foregoing device may be the CP function in the embodiment shown in FIG. 3, and any implementation of the CP function in the embodiment shown in FIG. 3 may be implemented the foregoing device of selecting user plane gateway in the embodiments, and the same beneficial effects are achieved, and details are not described herein again. In some embodiments of the present disclosure, the device of selecting a user plane gateway may be a CP function entity. Correspondingly, when the device of selecting a user plane gateway has an SM function, the device may be an SM function entity. When the device of selecting a user plane gateway has an MM function, the device may be an MM function entity.

Figure 25:
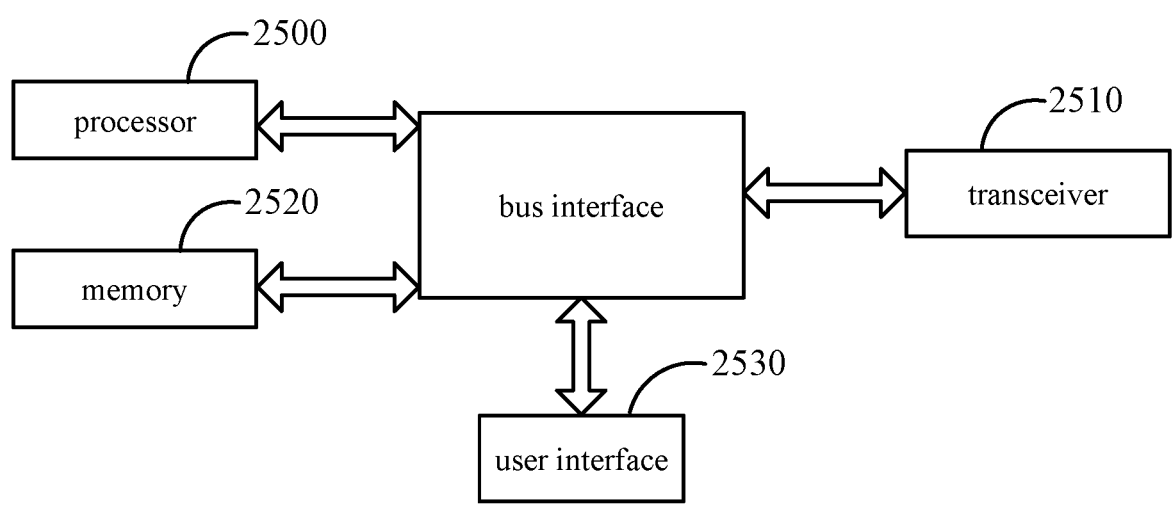
FIG. 25 is a schematic view of a device of selecting a user plane gateway in some embodiments of the present disclosure.

Referring to FIG. 25 which is a schematic view of a device of selecting a user plane gateway in some embodiments of the present disclosure. As shown in FIG. 25, the device of selecting a user plane gateway includes: a processor 2500, a transceiver 2510, a memory 2520, a user interface 2530 and a bus interface.

The processor 2500 is configured to read a program in the memory 2520 to:

receive a first data packet sent by a user equipment (UE);

select, based on the first data packet, a first target user plane gateway (UP-GW) for the UE.

The transceiver 2510 is configured to receive and send data under the control of the processor 2500.

In FIG. 25, the bus architecture may include any number of interconnected buses and bridges, linked by one or more processors represented by processor 2500 and various circuits of memory represented by memory 2520. The bus architecture can also link various other circuits such as peripherals, voltage regulators, and power management circuits, which are well known in the art and, therefore, will not be further described herein. The bus interface provides an interface. Transceiver 2510 can be a plurality of components, including a transmitter and a receiver, providing means for communicating with various other devices on a transmission medium. For different UEs, the user interface 2530 may also be an interface capable of externally connecting the required devices, including but not limited to a keypad, a display, a speaker, a microphone, a joystick, and the like. The processor 2500 is configured to manage the bus architecture and general processing, and the memory 2520 can store data used by the processor 2500 in performing operations.

Optionally, the processor 2500 is further configured to: send the first data packet to the first target UP-GW.

Optionally, after the processor 2500 selects the first target UP-GW for the UE based on the first data packet, the processor 2500 is further configured to:

switch on a timer based on the first target UP-GW;
receive a second data packet sent by the UE;
determine whether the timer expires;
select a second target UP-GW for the UE in the case that the timer expires; and
send the second data packet to the second target UP-GW.

Optionally, the processor 2500 is further configured to: send the second data packet to the first target UP-GW in the case that the timer does not expire.

Optionally, prior to receiving the first data packet sent by the UE, the processor 2500 is further configured to:
receive an attaching request sent by the UE;
acquire, based on the attaching request, subscription information of the UE;
determine based on the subscription information of the UE, whether the UE is an Internet of Things (IoT) user; and
in the case that the UE is an IoT user, select no UP-GW for the UE and send an attaching acception message to the UE.

Optionally, the processor 2500 selects the first target UP-GW for the UE according to one or more of the following:
subscription information of the UE, a location of the UE, a type of the UE, a UP load and a network topology.

Optionally, prior to receiving the first data packet sent by the UE, the processor 2500 is further configured to:
receive a session creation request sent by a mobility management (MM) function, where the session creation request is generated by the MM function based on an attaching request sent by the UE;
create, based on the session creation request, a connection context of the UE, and allocate an IP address for the UE; and
send to the MM function a session creation response carrying the IP address.

Optionally, the processor 2500 is further configured to:
receive a session deletion request sent by the MM function, where the session deletion request is generated by the MM function based on a detaching request sent by the UE;
delete the connection context of the UE and the IP address of the UE; and
send a session deletion response to the MM function.

Optionally, after the processor 2500 selects the first target UP-GW for the UE based on the first data packet, the processor 2500 is further configured to:
select, based on the first target UP-GW, a target session management (SM) function for the UE;
send a session creation request to the target SM function, where the session creation request is configured to trigger the target SM function to create a connection context of the UE and allocate an IP address for the UE;
receive a session creation response sent by the target SM function and carrying the IP address; and
send to the UE, based on the session creation response, an acknowledgement (ACK) message carrying the IP address.

Optionally, the processor 2500 sending a session creation request to the target SM function includes:
sending the session creation request and the first data packet to the target SM function.

Optionally, the processor 2500 is further configured to:
receive a detaching request sent by the UE;
send a detaching acception message to the UE, and delete a signaling connection with the UE.

Optionally, the user plane gateway selection device is an SM function entity.

Optionally, the user plane gateway selection device is an MM function entity.

It should be noted that, in some embodiments of the present disclosure, the foregoing device may be the CP function in the embodiment shown in FIG. 3, and any implementation of the CP function in the embodiment shown in FIG. 3 may be implemented the foregoing device of selecting user plane gateway in the embodiments, and the same beneficial effects are achieved, and details are not described herein again.

In the several embodiments provided in the present application, it should be understood that the disclosed method and apparatus may be implemented in other manners. For example, the device embodiments described above are merely illustrative. For example, the division of the unit is only a logical function division. In actual implementation, there may be another division manner, for example, multiple units or components may be combined or can be integrated into another system, or some features can be ignored or not executed. In addition, the mutual coupling or direct coupling or communication connection shown or discussed may be an indirect coupling or communication connection through some interface, device or unit, and may be in an electrical, mechanical or other form.

In addition, each functional unit in various embodiments of the present disclosure may be integrated into one processing unit, or each unit may be physically included separately, or two or more units may be integrated into one unit. The above integrated unit can be implemented in the form of hardware or in the form of hardware plus software functional units. The above-described integrated unit implemented in the form of a software functional unit can be stored in a computer readable storage medium.

The above software functional unit is stored in a storage medium and includes a plurality of instructions for causing a computer device (which may be a personal computer, a server, or a network device, etc.) to perform part of the steps of the transceiving method of the various embodiments of the present disclosure. The foregoing storage medium includes: a U disk, a mobile hard disk, a read-only memory (ROM), a random access memory (RAM), a magnetic disk, or an optical disk, and the like, and the program code can be stored.

The present disclosure is described with reference to flowchart illustrations and/or schematic views of methods, apparatus (system), and computer program products in some embodiments of the present disclosure. It will be understood that each flow and/or block of the flowchart illustrations. These computer program instructions can be provided to a processor of a general purpose computer, special purpose computer, embedded processor, or other programmable data processing device to produce a machine for the execution of instructions for execution by a processor of a computer or other programmable data processing device. Means for implementing the functions in one or more of the flow or in a block or blocks of the flow chart.

The computer program instructions can also be stored in a computer readable memory that can direct a computer or other programmable data processing device to operate in a particular manner, such that the instructions stored in the computer readable memory produce an article of manufacture comprising the instruction device. The apparatus implements the functions in one or more blocks of a flow or a flow and/or schematic view of the flowchart.

These computer program instructions can also be loaded onto a computer or other programmable data processing device such that a series of operational steps are performed on a computer or other programmable device to produce computer-implemented processing for execution on a computer or other programmable device. The instructions provide steps for implementing the functions in one or more of the flow or in a block or blocks of a flow diagram.

The above are merely some embodiments of the present disclosure. A person skilled in the art may make further modifications and improvements without departing from the principle of the present disclosure, and these modifications and improvements shall also fall within the scope of the present disclosure.

What is claimed is:

1. A method of selecting a user plane gateway, comprising:
   receiving, by a control plane (CP) function, a first data packet sent by a user equipment (UE);
   selecting, by the CP function, based on the first data packet, a first target user plane gateway (UP-GW) for the UE;
   wherein subsequent to the selecting, by the CP function, the first target UP-GW for the UE based on the first data packet, the method further comprises:
   switching on a timer by the CP function based on the first target UP-GW;
   receiving, by the CP function, a second data packet sent by the UE;
   determining, by the CP function, whether the timer expires; and
   selecting, by the CP function, a second target UP-GW for the UE in the case that the timer expires, and sending, by the CP function, the second data packet to the second target UP-GW; or
   sending, by the CP function, the second data packet to the first target UP-GW in the case that the timer does not expire.

2. The method according to claim 1, further comprising:
   sending, by the CP function, the first data packet to the first target UP-GW.

3. The method according to claim 1, wherein prior to the receiving, by the CP function, the first data packet sent by the UE, the method further comprises:
   receiving, by the CP function, an attaching request sent by the UE;
   acquiring, by the CP function, based on the attaching request, subscription information of the UE; and
   determining, by the CP function, based on the subscription information of the UE, whether the UE is an Internet of Things (IoT) user;
   in the case that the UE is an IoT user, selecting, by the CP function, no UP-GW for the UE, and sending, by the CP function, an attaching acception message to the UE.

4. The method according to claim 1, wherein the CP function selects the first target UP-GW for the UE based on one or more of: subscription information of the UE, a location of the UE, a type of the UE, a UP load and a network topology.

5. The method according to claim 1, wherein prior to the receiving, by the CP function, the first data packet sent by the UE, the method further comprises:
   receiving, by the CP function, a session creation request sent by a mobility management (MM) function, wherein the session creation request is generated by the MM function based on an attaching request sent by the UE;
   creating, by the CP function, based on the session creation request, a connection context of the UE, and allocating an IP address for the UE; and sending to the MM function, by the CP function, a session creation response carrying the IP address;
wherein subsequent to the receiving, by the CP function, the first data packet sent by the UE, the method further comprises:
receiving, by the CP function, a session deletion request sent by the MM function, wherein the session deletion request is generated by the MM function based on a detaching request sent by the UE;
deleting, by the CP function, the connection context of the UE and the IP address of the UE; and
sending, by the CP function, a session deletion response to the MM function.

6. The method according to claim 1, wherein subsequent to the selecting, by the CP function, based on the first data packet, the first target UP-GW for the UE, the method further comprises:
selecting, by the CP function, based on the first target UP-GW, a target session management (SM) function for the UE;
sending, by the CP function, a session creation request to the target SM function, wherein the session creation request is configured to trigger the target SM function to create a connection context of the UE and allocate an IP address for the UE;
receiving, by the CP function, a session creation response sent by the target SM function and carrying the IP address; and
sending to the UE, by the CP function, based on the session creation response, an acknowledgement (ACK) message carrying the IP address;
wherein the sending, by the CP function, the session creation request to the target SM function comprises:
sending, by the CP function, the session creation request and the first data packet to the target SM function.

7. The method according to claim 3, further comprising:
receiving, by the CP function, a detaching request sent by the UE;
sending, by the CP function, a detaching acception message to the UE, and deleting a signaling connection with the UE.

8. The method according to claim 1, wherein the CP function is an SM function.

9. The method according to claim 1, wherein the CP function is an MM function.

10. A device of selecting a user plane gateway, comprising: a processor, a transceiver and a memory, wherein the processor is configured to read a program in the memory to:
receive a first data packet sent by a user equipment (UE); and
select, based on the first data packet, a first target user plane gateway (UP-GW) for the UE;
wherein the processor is further configured to read the program in the memory to:
switch on a timer based on the first target UP-GW;
receive a second data packet sent by the UE;
determine whether the timer expires; and
select a second target UP-GW for the UE in the case that the timer expires, and send the second data packet to the second target UP-GW; or
send the second data packet to the first target UP-GW in the case that the timer does not expire.

11. The device according to claim 10, wherein the processor is further configured to read the program in the memory to send the first data packet to the first target UP-GW.

12. The device according to claim 10, wherein the processor is further configured to read the program in the memory to:
receive an attaching request sent by the UE;
acquire, based on the attaching request, subscription information of the UE;
determine based on the subscription information of the UE, whether the UE is an Internet of Things (IoT) user; and
in the case that the UE is an IoT user, select no UP-GW for the UE and send an attaching acception message to the UE.

13. The device according to claim 10, wherein the processor is further configured to read the program in the memory to select the first target UP-GW for the UE based on one or more of: subscription information of the UE, a location of the UE, a type of the UE, a UP load and a network topology.

14. The device according to claim 10, wherein the processor is further configured to read the program in the memory to:
receive a session creation request sent by a mobility management (MM) function, wherein the session creation request is generated by the MM function based on an attaching request sent by the UE;
create, based on the session creation request, a connection context of the UE, and allocate an IP address for the UE; and
send to the MM function a session creation response carrying the IP address;
wherein the processor is further configured to read the program in the memory to:
receive a session deletion request sent by the MM function, wherein the session deletion request is generated by the MM function based on a detaching request sent by the UE;
delete the connection context of the UE and the IP address of the UE; and
send a session deletion response to the MM function.

15. The device according to claim 10, wherein the processor is further configured to read the program in the memory to:
select, based on the first target UP-GW, a target session management (SM) function for the UE;
send a session creation request to the target SM function, wherein the session creation request is configured to trigger the target SM function to create a connection context of the UE and allocate an IP address for the UE;
receive a session creation response sent by the target SM function and carrying the IP address; and
send to the UE, based on the session creation response, an acknowledgement (ACK) message carrying the IP address;
wherein the processor is further configured to read the program in the memory to send the session creation request and the first data packet to the target SM function.

16. The device according to claim 12, wherein the processor is further configured to read the program in the memory to:
receive a detaching request sent by the UE;
send a detaching acception message to the UE, and delete a signaling connection with the UE.

17. The device according to claim 10, wherein the user plane gateway selection device is an SM function entity.

18. The device according to claim 10, wherein the user plane gateway selection device is an MM function entity.

19. A method of selecting a user plane gateway, comprising:
- receiving, by a control plane (CP) function, a first data packet sent by a user equipment (UE);
- selecting, by the CP function, based on the first data packet, a first target user plane gateway (UP-GW) for the UE;
- wherein prior to the receiving, by the CP function, the first data packet sent by the UE, the method further comprises:
- receiving, by the CP function, an attaching request sent by the UE;
- acquiring, by the CP function, based on the attaching request, subscription information of the UE; and
- determining, by the CP function, based on the subscription information of the UE, whether the UE is an Internet of Things (IoT) user;
- in the case that the UE is an IoT user, selecting, by the CP function, no UP-GW for the UE, and sending, by the CP function, an attaching acception message to the UE.

* * * * *